United States Patent
Petry

(10) Patent No.: US 6,222,851 B1
(45) Date of Patent: *Apr. 24, 2001

(54) ADAPTIVE TREE-BASED CONTENTION RESOLUTION MEDIA ACCESS CONTROL PROTOCOL

(75) Inventor: Brian David Petry, San Diego, CA (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,624

(22) Filed: May 29, 1998

(51) Int. Cl.[7] .................................................. H04L 12/413
(52) U.S. Cl. ......................... 370/447; 370/461; 370/462; 710/119
(58) Field of Search .................................. 370/445, 447, 370/449, 450, 451, 452, 453, 454, 455, 458, 461, 462; 710/107, 119, 120, 122, 123, 124, 125

(56) References Cited

U.S. PATENT DOCUMENTS

| | | | | |
|---|---|---|---|---|
| 4,493,074 | * | 1/1985 | Walter et al. ........................ | 370/445 |
| 4,593,282 | * | 6/1986 | Acampora et al. ............... | 340/825.5 |
| 4,817,080 | * | 3/1989 | Soha ..................................... | 370/252 |
| 4,855,997 | * | 8/1989 | Wilson et al. ....................... | 370/447 |
| 5,651,009 | * | 7/1997 | Perreault et al. .................... | 370/447 |
| 5,968,154 | * | 10/1999 | Cho ...................................... | 710/119 |
| 5,978,414 | * | 11/1999 | Nara ..................................... | 375/225 |
| 6,111,888 | * | 8/2000 | Green et al. ......................... | 370/461 |

* cited by examiner

Primary Examiner—Ajit Patel
Assistant Examiner—Bob A. Phunkulh
(74) Attorney, Agent, or Firm—Fish & Richardson P.C.

(57) ABSTRACT

An adaptive tree-based contention resolution media access control protocol for a local area network using orthogonal frequency division multiplexing. The invention uses constant tones in frequency bins to resolve contention between multiple transmitting nodes. All nodes are synchronized to transmit "contention tones" in a "contention frame." Each node is assigned a unique identification (ID) number, and this ID number is mapped to frequency bins by transmitting a tone in each bin corresponding to each 1-bit in the binary representation of the node's ID number. The result of multiple nodes each transmitting its unique ID during a contention frame is a complex frequency signal which each participating node decodes. The nodes then participate in a "resolution frame" in which all nodes again transmit tones in frequency bins. The resolution frame tones correspond only to tones in which the result of the contention frame indicated the presence of a tone where such node had 0-valued ID bits. All nodes receive the results of the resolution frame and record the results ("resolution bits") in a reasonably-balanced binary tree. If the resolution frame contained no tones in any frequency bin, only one node is contending and can transmit. Otherwise, the contending nodes utilize the resolution bits to continue with another cycle of contention and resolution frames. Each node follows a tree-traversal algorithm to determine the order of transmission among all contending nodes. The contention process continues until all contending nodes have transmitted their frames.

18 Claims, 2 Drawing Sheets

ADAPTIVE TREE-BASED CONTENTION RESOLUTION MEDIA ACCESS CONTROL PROTOCOL

TECHNICAL FIELD

This invention relates to local area network technology, and more particularly to a contention resolution media access control protocol for a local area network using orthogonal frequency division multiplexing.

BACKGROUND

Local area networks (LANs) allow multiple users (or "nodes") to utilize a shared media to transmit and receive digital information. The concept of a LAN is so useful that attempts are being made to extend LAN technology to Digital Subscriber Line (DSL) communication systems. DSL systems use existing telephone lines for high speed data communications. A DSL system essentially encodes digital data as analog signals at very high data rates using special modems. One signaling method used to transmit such analog signals is orthogonal frequency division multiplexing (OFDM), in which analog encoded data bits are transmitted as complex tones in distinct frequency bins.

A number of Digital Subscriber Line (DSL) systems have been proposed. For example, a version known as Asymmetric Digital Subscriber Line (ADSL) provides a system that applies signals over a single twisted-wire pair that supports "plain old telephone service" (POTS) and high-speed duplex (simultaneous two-way) and simplex (from a network to the customer installation) digital services. Part of the proposed standard for ADSL is set forth in the Draft Proposed Revision of ANSI T1. 413-1995—Interface Between Networks and Customer Installation—Asymmetric Digital Subscriber Line (ADSL) Metallic Interface (Sep. 26, 1997), which is hereby incorporated by reference.

In order to permit sharing of a LAN media, a media access control (MAC) protocol must resolve "contention" between the users seeking to access the media simultaneously. In a media such as DSL systems, a variety of possible MAC protocols may be used. For example, each node on the network can synchronize transmissions based on simultaneous detection of silence (i.e., no node is currently transmitting data). However, DSL systems are inherently noisy due to cross-talk in telephone wiring bundles, reflections, etc. Further, the wiring environment within a home may be particularly "hostile", with unterminated telephone extensions of various lengths causing reflections. Accordingly, silence is not easily detectable, and positive identification of idle media may be difficult or impossible to achieve.

Another technique is described in co-pending U.S. patent application No. 09/003,844, entitled "Method and Protocol for a Medium Access Control Layer for Local Area Networks with Multiple-Priority Traffic", filed Jan. 7, 1998 and assigned to the assignee of the present invention. In this technique, each node waits for a certain period of silence, then transmit a single randomly selected tone as an intent-to-transmit signal. All nodes receive the combined intent-to-transmit signals of all other signals. Each station makes a determination as to whether it had transmitted the highest frequency, and if so, begins to transmit data. If two or more stations had sent the same frequency as an intent-to-transmit signal, a collision will occur, indicated by the presence of garbled data on the medium. The colliding nodes stop transmitting data and repeat the process above until no collisions exist. A drawback of this technique is that each transmitting node must "listen" to what it is transmitting to detect a collision, which requires data demodulation. Data demodulation requires a substantial expenditure of processing resources and complex processing.

Accordingly, the invention has determined that it would be useful to have a contention resolution MAC protocol that is simple to implement, provides positive identification of idle media, and does not require data demodulation. The present invention provides a method and system for achieving this end.

SUMMARY

The invention uses an adaptive tree-based contention resolution media access control protocol that includes multiple contention phases. Each node transmitter performs simple tone detection while transmitting, but is not required to perform data demodulation to detect collisions.

More particularly, the preferred embodiment of the invention uses constant tones in OFDM frequency bins to resolve contention between multiple transmitting nodes. All nodes are roughly synchronized to transmit "contention tones" in a "contention frame." Each node is assigned a unique identification (ID) number, and this ID number is mapped to frequency bins by transmitting a tone in each bin corresponding to each 1-bit in the binary representation of the node's ID number. The result of multiple nodes each transmitting its unique ID during a contention frame is a complex frequency signal.

After the contention frame has completed, each participating node decodes the complex frequency signal such node received while it was transmitting. Following the "contention frame", all nodes participate in a "resolution frame" in which all nodes again transmit tones in frequency bins. However, the tones transmitted by a node in a resolution frame correspond only to tones in which the result of the contention frame indicated the presence of a tone where such node had 0-valued ID bits. In other words, a node transmits 1-bits in frequency bins corresponding to positions where the contention frame turned 0-bits of its ID into 1-bits.

All nodes receive the results of the resolution frame and record the results (called "resolution bits") in a reasonably-balanced binary tree. If the resolution frame contained no tones in any frequency bin, one and only one node is contending and can transmit. Otherwise, the contending nodes utilize the resolution bits to continue with another cycle of contention and resolution frames to divide the contenders and resolve contention. In the preferred embodiment, after transmitting, a node refrains from entering into contention/resolution cycles until all currently contending nodes have been able to transmit. In the preferred embodiment, each node follows a tree-traversal algorithm to determine the order of transmission among all contending nodes. When the last node transmits, the contention process is complete and all contending nodes have transmitted their frames. In addition, all non-contending nodes monitor the contention/resolution process to determine when they may participate in a next set of contention/resolution cycles.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

Figure 1:
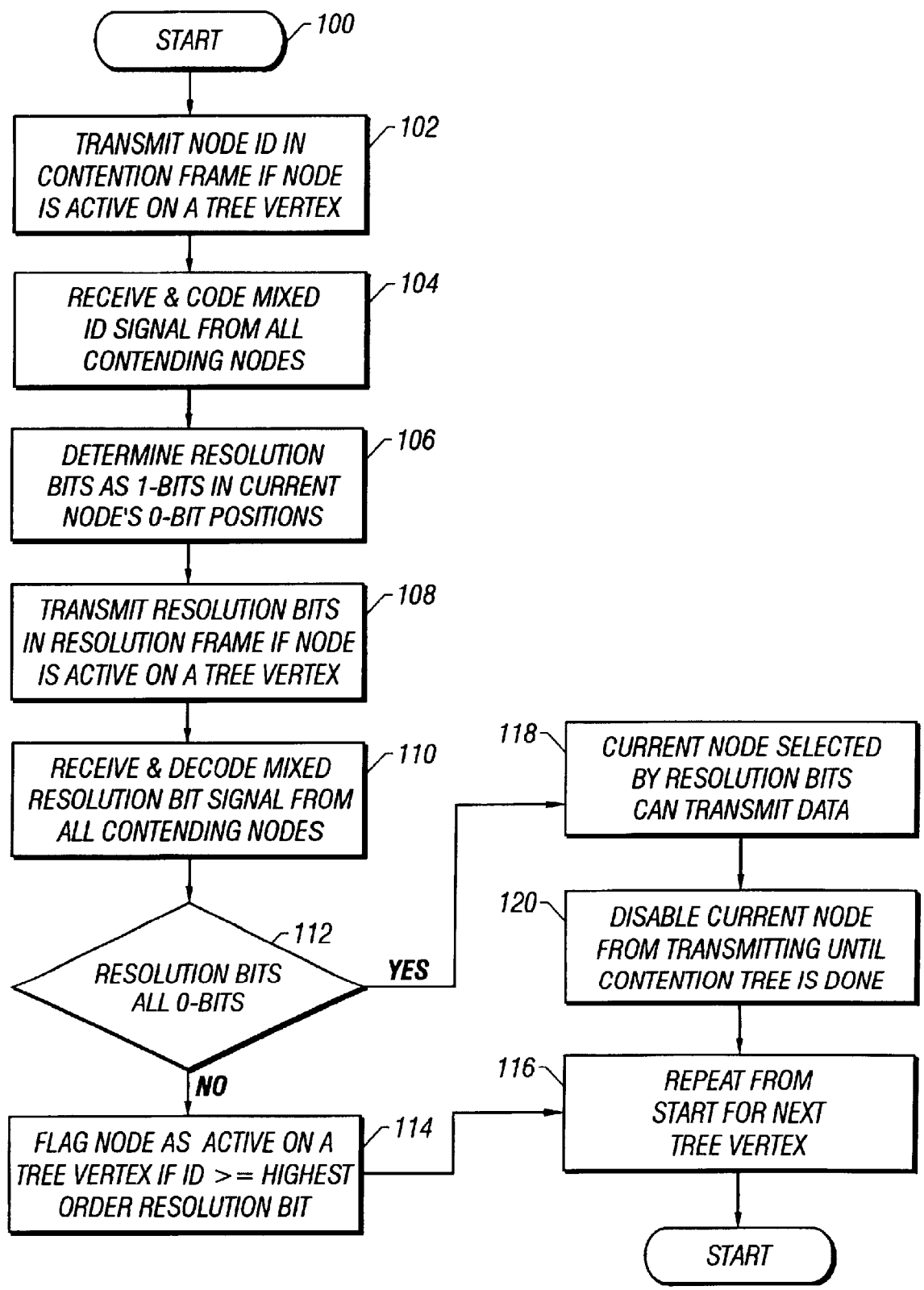
FIG. 1 is a flowchart of the preferred embodiment of the invention.

The invention uses an adaptive tree-based contention resolution media access control protocol that includes multiple contention phases. Each node transmitter performs simple tone detection while transmitting, but is not required to perform data demodulation to detect collisions.

More particularly, the preferred embodiment of the invention uses constant tones in OFDM frequency bins to resolve contention between multiple transmitting nodes. All nodes are roughly synchronized to transmit "contention tones" in a "contention frame." Synchronization may be achieved by using silence detection as a rough indication that no other node is transmitting (detection of silence is not itself used as a positive indicator that no collision will occur). Each node is assigned a unique identification (ID) number, and this ID number is mapped to frequency bins by transmitting a tone in each bin corresponding to each 1-bit in the binary representation of the node's ID number. The bins are numbered 0 . . . N, where N equals the number of bins. Thus, for example, if the ID numbers are 16 bits long, 16 frequency bins would be used, with a tone corresponding to each 1-bit of the ID number transmitted in one of 16 frequency bins. Each ID may be set by a LAN administrator or by any desired automatic process. In the illustrated embodiment, an ID of zero is not permitted, since that is a flag value indicating that contention no longer exists. The result of multiple nodes each transmitting its unique ID during a contention frame is a complex frequency signal.

After the contention frame has completed, each participating node (i.e., a node desiring to transmit data) decodes the complex frequency signal such node received while it was transmitting. This listening mode requires only simple decoding of the received signal into frequency bins using, for example, a fast Fourier transform (FFT) fiction implemented on a digital signal processor (DSP), in known fashion. Each node simply looks for presence of energy in each frequency bin above a selected threshold. All transmitting nodes send their address at the same time (the start-of-transmit for all nodes is synchronized), and a node can have 1-bits in address positions where another node has 0-bits. However, any node having 1-bits where another node has 0-bits cannot detect a collision with such other node, but the other node can. It is guaranteed that at least one node will detect a collision.

Each node records any 1-bit positions received that were 0-bits in that node's ID transmission, thus recognizing contention. Following the "contention frame", all nodes participate in a "resolution frame" in which all nodes again transmit tones in frequency bins. However, the tones transmitted by a node in a resolution frame correspond only to tones in which the result of the contention frame indicated the presence of a tone where such node had 0-valued ID bits. In other words, a node transmits 1-bits in frequency bins corresponding to positions where the contention frame turned 0-bits of its ID into 1-bits. In one embodiment, all nodes that detected a different address than theirs (i.e., some of their 0-bits were turned into 1-bits) send a tone on a reserved "collision imminent" frequency bin to indicate to all nodes (even those not currently participating in the contention resolution cycle) that multinode contention is necessary and a collision is about to happen.

All nodes receive the results of the resolution frame and record the results (called "resolution bits"). If the resolution frame contained no tones in any frequency bin (i.e., the resolution bits are all 0), one and only one node is contending and can transmit. Otherwise, the contending nodes utilize the resolution bits to continue with another cycle of contention and resolution frames to divide the contenders and resolve contention. In the preferred embodiment, after transmitting, a node refrains from entering into contention/resolution cycles until all currently contending nodes have been able to transmit.

In the preferred embodiment, each node follows an algorithm to determine the order of transmission among all contending nodes. Dividing the contenders can proceed in several ways. For instance, if nodes are assigned sequential ID numbers, it would be optimal to divide the contenders one bit at a time, beginning with the high order resolution bit, thus resulting in a reasonably-balanced binary tree. Otherwise, if node IDs are somewhat random then it may be optimal to divide the resolution bits in half for each subsequent conten-tion/resolution cycle. In any case, each contending node tracks the contention/resolution process and participates in contention at the appropriate times. When the process reaches the "bottom" of the search tree, the resolution bits are all 0, and a node knows it can transmit next. Following that node's transmission, the contention/resolution process continues with the remaining nodes at the last position in the search tree. When the last node transmits, the contention process is complete and all contending nodes have transmitted their frames. In addition, all non-contending nodes monitor the contention/resolution process to determine when they may participate in a next set of contention/resolution cycles.

FIG. 1 is a flowchart of the preferred embodiment of the invention. Beginning at a start point (STEP 100), each node active on a tree vertex transmits its node ID in a contention frame (STEP 102). Initially, all contending nodes transmit their node ID. Each node then receives a mixed ID signal from all contending nodes, and decodes that signal into frequency bins (STEP 104). Each contending node then determines a set of resolution bits as 1-bits in the decoded ID signal that match such node's 0-bit positions of its ID (STEP 106).

Thereafter, each node active on a tree vertex transmits its resolution bits in a resolution frame (STEP 108). Each node then receives a mixed resolution bit signal from all contending nodes, and decodes that signal into frequency bins (STEP 110). Each contending node determines if all the resolution bits are 0-bits (STEP 112). If not, each node is flagged as active on a tree vertex if the binary representation of its ID has 1-bits where the corresponding resolution bits also are 1-bits (STEP 114). The cycle is then repeated from the starting point for the next tree vertex (STEP 118).

If the received resolution bits are all 0-bits (STEP 112) for a node, then that node is the only remaining node and can transmit data (STEP 118). Thereafter, in the preferred embodiment, the transmitting node is disabled from again transmitting until the current contention tree has been completely traversed (STEP 120). The cycle is then repeated from the starting point for the next tree vertex (STEP 118).

In an alternative embodiment, additional frequency bins may be used to encode a transmission priority. For example, three additional frequency bins can be used to indicate one of four priorities (000, 100, 010, 001). After the initial contention frame, each node decodes the logical "OR" of requesting priorities. If any node determines that the requested priority is higher than its requested priority, that node will immediately drop out of contention and will not participate in the subsequent resolution cycle. Further, that node will not participate again until the indicated higher-priority contention tree is complete. However, when a node drops out of contention based on priority, a leaf vertex could have all of the contention bits set to "0" and no node will transmit on that vertex. Accordingly, the remaining nodes must detect this and revert to the next-highest, unsearched right branch of the tree.

EXAMPLE

Figure 2:
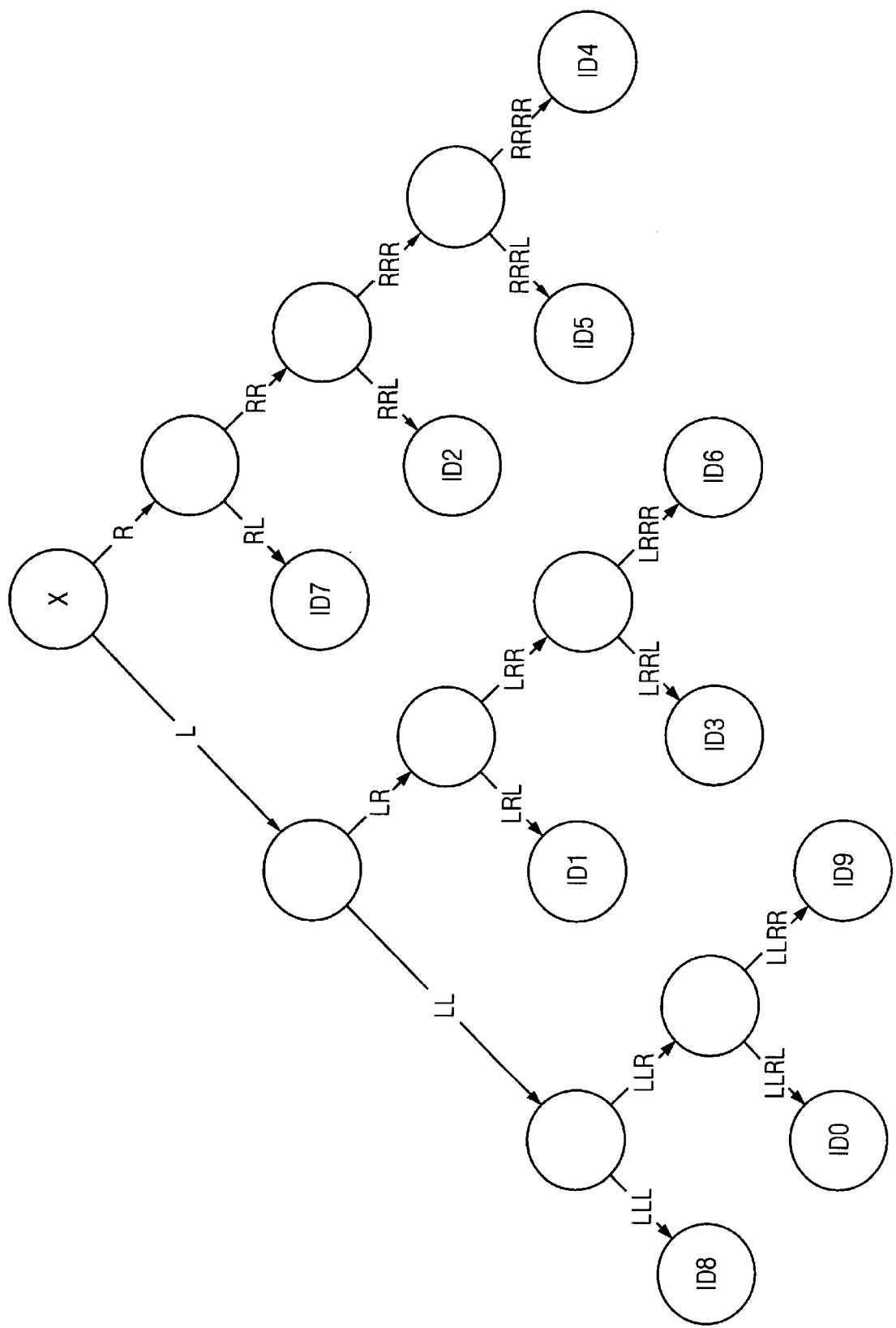
FIG. 2 is a binary tree showing traversal of one set of contention/resolution cycles for a particular example of the invention.

Following is an example of one embodiment of the invention in which 10 nodes are contending for access to an OFDM medium such as a DSL communication system. TABLE 1 shows the unique binary IDs for each of the 10 nodes (the hexadecimal equivalent is shown also). FIG. 2 is a binary tree showing traversal of one set of contention/resolution cycles for this particular example of the invention. To the right of each cycle described below is a letter code indicating the corresponding position in the binary tree.

TABLE 1

| Node |
| --- |
| 0: ID=1100000110111101 0xC1BD |
| 1: ID=1010000100000010 0xA102 |
| 2: ID=0101000010011011 0x509B |
| 3: ID=1001111110111110 0x9FBE |
| 4: ID=0100000101111111 0x417F |
| 5: ID=0100001101010001 0x4351 |
| 6: ID=1000110110010110 0x8D96 |
| 7: ID=0110111000001011 0x6E0B |
| 8: ID=1110110111001111 0xEDCF |
| 9: ID=1100000110011110 0xC19E |

During each cycle, each node transmits its address during a contention frame, and resolution bits during a resolution frame. All of the bits of the IDs in effect will be logically OR'd together. For the first cycle, all of the resolution bits are 1-bits, and the binary search tree is at the root, X.

| CONTENTION FRAME | RESOLUTION FRAME |
| --- | --- |
| Cycle 0: ID/R=1111111111111111 | 1111111111111111 |

Note that the high order (left-most) resolution bit is set to a 1-bit. Only nodes having an ID with the high order bit set to a 1-bit will participate in the next cycle on the left branch of tree. Thus, in this example, nodes 0, 1, 3, 6, 8, and 9 will be active on the next cycle. The "active" bit position of the resolution frame is shown below in a mask value to the right of each active node's ID number (in Table 2, the mask value is "1000000000000000"). The mask value should be the same for all nodes participating in contention at a particular tree vertex. The mask is applied to each such node's ID to determine if the node should participate in contention on the vertex, and provides a way to monitor the state of each node's vertex calculation, as a debugging aid.

TABLE 2

| |
| --- |
| 0: I/M=1100000110111101 1000000000000000 |
| 1: I/M=1010000100000010 1000000000000000 |
| 3: I/M=1001111110111110 1000000000000000 |
| 6: I/M=1000110110010110 1000000000000000 |

TABLE 2-continued

| |
| --- |
| 8: I/M=1110110111001111 1000000000000000 |
| 9: I/M=1100000110011110 1000000000000000 |

During the next cycle, each of these nodes will again transmit its ID number during the contention frame, and the resolution bits determined by such node in the resolution frame. For example, node 0 will transmit "00111100100010" as its resolution bits, since at least one other node had a 1-bit in each position in which node 0 had a 0-bit.

Cycle 1: ID/R=1111111111111111 0111111011111111 L

For cycle 1, since each remaining node ID includes a 1-bit in the high order bit position, the resolution bits necessarily will have a 0-bit in the high order bit position. Accordingly, only nodes with a 1-bit in the second highest bit position (nodes 0, 8, 9) will participate in the next contention/resolution cycle, as shown in TABLE 3.

TABLE 3

| |
| --- |
| 0: I/M=1100000110111101 0100000000000000 |
| 8: I/M=1110110111001111 0100000000000000 |
| 9: I/M=1100000110011110 0100000000000000 |

Cycle 2: ID/R=1110110111111111 0010110001110011 LL

For cycle 2, since each remaining node ID includes a 1-bit in the second highest order bit position, the resolution bits necessarily will have a 0-bit in the that bit position. Accordingly, only nodes with a 1-bit in the third highest bit position (node 8) will participate in the next contention/resolution cycle, as shown in TABLE 4. In general, the highest-order 1-bit in the resolution bit set indicates the position in each node ID that distinguishes that node from at least one other contending node. Stated another way, the resolution bits determine which remaining contending nodes have an ID greater than or equal to $2^{N-1}$, where N is the position of the highest order 1-bit in the current resolution bit set. When the resolution bit set finally reaches a value of all 0-bits, the corresponding node is no longer in contention with any other node.

TABLE 4

| |
| --- |
| 8: I/M=1110110111001111 0010000000000000 |

The only node transmitting at this point is node 8. The resolution bits will come back as all 0-bits in the next cycle.

Cycle 3: ID/R=1110110111001111 0000000000000000 LLL

Because the resolution bits indicate that there is no collision with any other node, this is a leaf of the search tree and node 8 "knows" it can transmit data in the next data transmission cycle. The remaining nodes have closely followed the progress of the contention/resolution cycles. Consequently, the two nodes "closest" to node 8 in the prior set of contention/resolution cycles, nodes 0 and 9, will participate in the next contention/resolution cycle, as shown in TABLE 5. The other nodes in the original set of 10 nodes will similarly reenter the contention/resolution cycles at appropriate points.

TABLE 5

0: I/M=1100000110111101 0000110001110011
>>>Node 8 (ID 0xedcf) transmit>>>
9: I/M=1100000110011110 0000110001110011

Following are the remaining cycles for the set of 10 original nodes, with TABLES 6–20 showing information similar to TABLES 2–5.

Cycle 4: ID/R=1100000110111111 0000000000100011 LLR

TABLE 6

0: I/M=1100000110111101 0000000000100000

Cycle 5: ID/R=1100000110111101 0000000000000000 LLRL

TABLE 7

>>>Node 0 (ID 0xc1bd) transmit>>>
9: I/M=1100000110011110 0000000000000011

Cycle 6: ID/R=1100000110011110 0000000000000000 LLRR

TABLE 8

1: I/M=1010000100000010 0011111011111111
3: I/M=1001111110111110 0011111011111111
6: I/M=1000110110010110 0011111011111111
>>>Node 9 (ID 0xc19e) transmit>>>

Cycle 7: ID/R=1011111110111110 0011111010111100 LR

TABLE 9

1: I/M=1010000100000010 0010000000000000

Cycle 8: ID/R=1010000100000010 0000000000000000 LRL

TABLE 10

>>>Node 1 (ID 0xa102) transmit>>>
3: I/M=1001111110111110 0001111010111100
6: I/M=1000110110010110 0001111010111100

Cycle 9: ID/R=1001111110111110 0001001000101000 LRR

TABLE 11

3: I/M=1001111110111110 0001000000000000

Cycle 10: ID/R=1001111110111110 0000000000000000 LRRL

TABLE 12

>>>Node 3 (ID 0x9fbe) transmit>>>
6: I/M=1000110110010110 0000001000101000

Cycle 11: ID/R=1000110110010110 0000000000000000 LRRR

TABLE 13

2: I/M=0101000010011011 0111111111111111
4: I/M=0100000101111111 0111111111111111
5: I/M=0100001101010001 0111111111111111
>>>Node 6 (ID 0x8d96) transmit>>>
7: I/M=0110111000001011 0111111111111111

Cycle 12: ID/R=0111111111111111 0011111111111110 R

TABLE 14

7: I/M=0110111000001011 0010000000000000

Cycle 13: ID/R=0110111000001011 0000000000000000 RL

TABLE 15

2: I/M=0101000010011011 0001111111111110
4: I/M=0100000101111111 0001111111111110
5: I/M=0100001101010001 0001111111111110
>>>Node 7 (ID 0x6e0b) transmit>>>

Cycle 14: ID/R=0101001111111111 0001001111101110 RR

TABLE 16

2: I/M=0101000010011011 0001000000000000

Cycle 15: ID/R=0101000010011011 0000000000000000 RRL

TABLE 17

>>>Node 2 (ID 0x509b) transmit>>>
4: I/M=0100000101111111 0000001111101110
5: I/M=0100001101010001 0000001111101110

Cycle 16: ID/R=0100001101111111 0000001000101110 RRR

TABLE 18

5: I/M=0100001101010001 0000001000000000

Cycle 17: ID/R=0100001101010001 0000000000000000 RRRL

TABLE 19

4: I/M=0100000101111111 0000000000101110
>>>Node 5 (ID 0x4351) transmit>>>

Cycle 18: ID/R=0100000101111111 0000000000000000 RRRR

TABLE 20

>>>Node 4 (ID 0x417f) transmit>>>

The entire set of contention/resolution cycles for the original 10 nodes is completed in 19 cycles.

A fundamental principle of this invention is to apply repetitive contention/resolution OFDM frames to resolve contention. Without OFDM tone/bin-based contention resolution, and with a MAC protocol that requires collision detection, a transmitting node is required to perform full demodulation of data it is transmitting to detect a collision. The invention eliminates using modulation resources to detect a collision. Thus, the invention simplifies node implementation and requires fewer processing resources.

Computer Implementation

Aspects of the invention may be implemented in hardware or software, or a combination of both. However, preferably, the algorithms and processes of the invention are implemented in one or more computer programs executing on programmable systems each comprising at least one processor (e.g., a DSP), at least one data storage system (including volatile and non-volatile memory and/or storage elements), at least one input device, and at least one output device. Program code is applied to input data to perform the functions described herein and generate output information. The output information is applied to one or more output devices, in known fashion.

Each program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. For example, the number of bits used for the node ID may be longer or shorter than 16, or may be a subset (e.g., after application of a hashing algorithm) of a longer binary ID. Accordingly, other embodiments are within the scope of the following claims.

What is claimed is:

1. An adaptive tree-based contention resolution method for a local area network using orthogonal frequency division multiplexing and comprising a plurality of nodes, including the steps of:
   (a) transmitting from each contending node a node identifier during a contention frame;
   (b) determining from all node identifiers transmitted during the contention frame a set of resolution bits for each contending node;
   (c) transmitting the sets of resolution bits during a resolution frame;
   (d) applying the sets of resolution bits transmitted during the resolution frame to determine if there is no further contention by other contending nodes with respect to a particular contending node, and if so, enabling such particular contending node to transmit data;
   (e) otherwise, applying the sets of resolution bits transmitted during the resolution frame to further resolve contention between at least two remaining contending nodes;
   (f) repeating steps (a)–(e) for the remaining contending nodes.

2. The method of claim 1, further including the step of disabling a node after such node transmits data, until all currently contending nodes have transmitted data.

3. An adaptive tree-based contention resolution method for a local area network using orthogonal frequency division multiplexing and comprising a plurality of nodes, including the steps of:
   (a) transmitting a node identifier from at least one contending node during a contention frame;
   (b) determining in at least one contending node a set of resolution bits from all node identifiers transmitted during the contention frame;
   (c) transmitting the set of resolution bits determined in at least one contending node during a resolution frame;
   (d) applying all sets of resolution bits transmitted during the resolution frame to determine if there is no further contention by other contending nodes with respect to a particular contending node, and if so, enabling such particular contending node to transmit data;
   (e) otherwise, applying the sets of resolution bits transmitted during the resolution frame to further resolve contention between at least two remaining contending nodes;
   (f) repeating steps (a)–(e) for the remaining contending nodes.

4. The method of claim 3, further including the step of disabling a node after such node transmits data, until all currently contending nodes have transmitted data.

5. An adaptive tree-based contention resolution method for a local area network using orthogonal frequency division multiplexing and comprising a plurality of nodes, including the steps of:
   (a) transmitting from each contending node a node identifier during a contention frame;
   (b) receiving in each node a mixed identifier signal from all contending nodes;
   (c) decoding in each contending node the mixed identifier signal into frequency bins;
   (d) determining in each contending node resolution bits as 1-bits in the decoded identifier signal that match such node's 0-bit positions of its identifier;
   (e) transmitting from each contending node such node's resolution bits during a resolution frame;
   (f) receiving in each node a mixed resolution bit signal from all contending nodes;
   (g) decoding in each contending node mixed resolution bit signal into frequency bins;
   (h) determining in each contending node if all the resolution bits are 0-bits;
      (1) if the resolution bits are all 0-bits for a node, then enabling that node to transmit data;
      (2) otherwise, flagging such node as active on a binary tree vertex if the binary representation of such nodes identifier has 1-bits where the corresponding resolution bits also are 1-bits;
   (i) repeating steps (a)–(h) for the remaining contending nodes.

6. The method of claim 5, further including the step of disabling a node after such node transmits data, until all currently contending nodes have transmitted data.

7. A system for adaptively resolving contention between a plurality of nodes in a local area network using orthogonal frequency division multiplexing, including:

(a) means for transmitting from each contending node a node identifier during a contention frame;

(b) means for determining from all node identifiers transmitted during the contention frame a set of resolution bits for each contending node;

(c) means for transmitting the sets of resolution bits during a resolution frame;

(d) means for repeatedly applying the sets of resolution bits transmitted during the resolution frame to determine if there is no further contention by other contending nodes with respect to a particular contending node, and if so, enabling such particular contending node to transmit data, and otherwise, further resolving contention between at least two remaining contending nodes.

8. The system of claim 7, further including means for disabling a node after such node transmits data, until all currently contending nodes have transmitted data.

9. A system for adaptively resolving contention between a plurality of contending nodes in a local area network using orthogonal frequency division multiplexing, including:

(a) means for transmitting a node identifier from a current contending node during a contention frame;

(b) means for determining in the current contending node a set of resolution bits from all node identifiers transmitted during the contention frame;

(c) means for transmitting the set of resolution bits determined in the current contending node during a resolution frame;

(d) means for repeatedly applying all sets of resolution bits transmitted during the resolution frame to determine if there is no further contention by other contending nodes with respect to the current contending node, and if so, enabling the current contending node to transmit data, and otherwise, further resolving contention between the current contending node and at least one other remaining contending node.

10. The method of claim 9, further including the step of disabling a node after such node transmits data, until all currently contending nodes have transmitted data.

11. A system for adaptively resolving contention between a plurality of nodes in a local area network using orthogonal frequency division multiplexing, including:

(a) means for transmitting from each contending node a node identifier during a contention frame;

(b) means for receiving in each node a mixed identifier signal from all contending nodes;

(c) means for decoding in each contending node the mixed identifier signal into frequency bins;

(d) means for determining in each contending node resolution bits as 1-bits in the decoded identifier signal that match such node's 0-bit positions of its identifier;

(e) means for transmitting from each contending node such node's resolution bits during a resolution frame;

(f) means for receiving in each node a mixed resolution bit signal from all contending nodes;

(g) means for decoding in each contending node mixed resolution bit signal into frequency bins;

(h) means for determining in each contending node if all the resolution bits are 0-bits and, if the resolution bits are all 0-bits for a node, then enabling that node to transmit data, and otherwise, flagging such node as active on a binary tree vertex if the binary representation of such nodes identifier has 1-bits where the corresponding resolution bits also are 1-bits.

12. The system of claim 11, further including means for disabling a node after such node transmits data, until all currently contending nodes have transmitted data.

13. A computer program, residing on a computer-readable medium, for adaptively resolving contention between a plurality of nodes in a local area network using orthogonal frequency division multiplexing, the computer program comprising instructions for causing a computer to:

(a) transmit from each contending node a node identifier during a contention frame;

(b) determine from all node identifiers transmitted during the contention frame a set of resolution bits for each contending node;

(c) transmit the sets of resolution bits during a resolution frame;

(d) apply the sets of resolution bits transmitted during the resolution frame to determine if there is no further contention by other contending nodes with respect to a particular contending node, and if so, enable such particular contending node to transmit data;

(e) otherwise, apply the sets of resolution bits transmitted during the resolution frame to further resolve contention between at least two remaining contending nodes;

(f) repeat functions (a)–(e) for the remaining contending nodes.

14. The program of claim 13, further including instructions for causing the computer to disable a node after such node transmits data, until all currently contending nodes have transmitted data.

15. A computer program, residing on a computer-readable medium, for adaptively resolving contention between a plurality of nodes in a local area network using orthogonal frequency division multiplexing, the computer program comprising instructions for causing a computer to:

(a) transmit a node identifier from at least one contending node during a contention frame;

(b) determine in at least one contending node a set of resolution bits from all node identifiers transmitted during the contention frame;

(c) transmit the set of resolution bits determined in at least one contending node during a resolution frame;

(d) apply all sets of resolution bits transmitted during the resolution frame to determine if there is no further contention by other contending nodes with respect to a particular contending node, and if so, enable such particular contending node to transmit data;

(e) otherwise, apply the sets of resolution bits transmitted during the resolution frame to further resolve contention between at least two remaining contending nodes;

(f) repeat fictions (a)–(e) for the remaining contending nodes.

16. The program of claim 15, further including instructions for causing the computer to disable a node after such node transmits data, until all currently contending nodes have transmitted data.

17. A computer program, residing on a computer-readable medium, for adaptively resolving contention between a plurality of nodes in a local area network using orthogonal frequency division multiplexing, the computer program comprising instructions for causing a computer to:

(a) transmit from each contending node a node identifier during a contention flame;

(b) receive in each node a mixed identifier signal from all contending nodes;

(c) decode in each contending node the mixed identifier signal into frequency bins;

(d) determine in each contending node resolution bits as 1-bits in the decoded identifier signal that match such node's 0-bit positions of its identifier;
(e) transmit from each contending node such node's resolution bits during a resolution frame;
(f) receive in each node a mixed resolution bit signal from all contending nodes;
(g) decode in each contending node mixed resolution bit signal into frequency bins;
(h) determine in each contending node if all the resolution bits are 0-bits;
  (1) if the resolution bits are all 0-bits for a node, then enable that node to transmit data;
  (2) otherwise, flag such node as active on a binary tree vertex if the binary representation of such nodes identifier has 1-bits where the corresponding resolution bits also are 1-bits;
(i) repeat fictions (a)–(h) for the remaining contending nodes.

18. The program of claim 17, further including instructions for causing the computer to disable a node after such node transmits data, until all currently contending nodes have transmitted data.

* * * * *